United States Patent [19]
Goldacker et al.

[11] 3,869,374
[45] Mar. 4, 1975

[54] COUNTERCURRENT EXTRACTION COLUMN FOR LIQUID-LIQUID EXTRACTION AND SIMULTANEOUS ELECTROLYSIS

[75] Inventors: Hubert Goldacker, Karlsruhe; Helmut Hausberger, Bad Langenbrucken; Helmut Schmieder, Karlsruhe, all of Germany

[73] Assignee: Gesellschaft fur Kernforshung mbH, Karlsruhe, Germany

[22] Filed: Mar. 23, 1973

[21] Appl. No.: 344,151

[30] Foreign Application Priority Data
Dec. 13, 1972 Germany............................ 2261018

[52] U.S. Cl.................. 204/273, 204/1.5, 204/269, 204/275, 423/8
[51] Int. Cl............................................. B01k 3/00
[58] Field of Search ........... 204/1.5, 269, 273, 275; 423/8, 9, 10

[56] References Cited
UNITED STATES PATENTS
3,730,851  5/1973  Schwind et al. .................... 205/1.5
3,793,177  2/1974  Baumgartner et al. ............. 204/269

Primary Examiner—John H. Mack
Assistant Examiner—W. I. Solomon
Attorney, Agent, or Firm—Spencer & Kaye

[57] ABSTRACT

A countercurrent extraction column for carrying out a liquid-liquid extraction of two phases which are insoluble in each other, where one of the phases is a conducting phase and the other of the phases is a non-conducting phase, by the use of simultaneous electrolysis. This extraction process is carried out in an upright column. A wall is provided within the column so as to separate the column into an anode compartment and a cathode compartment. An anode is provided within the anode compartment and a cathode within the cathode compartment. A communicating element is provided within the wall separating the two compartments so as to establish communication between the compartments. The communicating element is oriented so as to open into the compartment through which flows the non-conducting phase in such a manner as to face away from the direction of flow of the non-conducting phase.

21 Claims, 3 Drawing Figures

COUNTERCURRENT EXTRACTION COLUMN FOR LIQUID-LIQUID EXTRACTION AND SIMULTANEOUS ELECTROLYSIS

BACKGROUND OF THE INVENTION

The present invention relates to a countercurrent extraction column for the liquid-liquid extraction of two phases insoluble in each other with simultaneous electrolysis, which includes a tube in which the anode compartment is surrounded by the cathode compartment without any diaphragm separating them.

Such countercurrent extraction columns are commonly used, among other purposes, for the separation of uranium-plutonium compounds by liquid-liquid extraction. A column of the type mentioned above has not been known before and is not part of the present state of the art.

From the German Offenlegungsschrift (published patent application) No. 2,140,836 a liquid-liquid extraction column with simultaneous electrolysis is known in which the cathode compartment is separated from the anode compartment by a diaphragm, i.e., a membrane made of a porous ceramic material. This porous membrane, constitutes a central tube, the electrode contained in it is a hollow tube.

However, the use of a diaphragm gives rise to major disadvantages of this column. Over prolonged periods of operation also the organic phase, which must not contact the anode, will pass through the porous membrane, thus rendering impossible an absolute separation between the dispersion and the purely aqueous anolyte. The finely dispersed organic phase and its radiolytic and electrolytic decomposition products plug up the pores of the diaphragm. Another disadvantage is generated by the voltage drop caused by the higher electric resistance. This increased voltage drop is responsible for the relatively high electric heat losses. In addition, the use of stainless steel will create severe corrosion problems in such equipment.

Another device for the execution of an electrochemical method with simultaneous liquid-liquid extraction is known from the German Offenlegungsschrift No. 2,158,058. In this device, the cathode compartment is separated from the anode compartment also by a diaphragm. The cathode compartment contains metal coated glass spheres which are connected with an electric line and will act as cathodes. With respect to the diaghragm, the same limitations apply as above. In addition, in this device the reduction is performed in zones filled mainly with mixed phase, and it is one of the conditions that the continuous phase be the aqueous phase; however, the continuous phase cannot be prevented from becoming the organic phase. In this case, there is no longer any conducting connection and electrolysis will be interrupted. In addition, there is a danger of the electric contact between the sphere deteriorating if, for instance, one of the two phases has better wetting properties than the other. If this happens to the organic phase, an insulating layer of liquid will get between the spheres and thus partly interrupt the metallic contact, which greatly deteriorates the electrolytic properties. Moreover, the shape of the active cathode area is very unfavorable, especially in the rear areas, in a pile of spheres of this kind.

If a device of this kind is built for liquid-liquid extraction with simultaneous electrolysis (a) without a diaphragm and (b) with the electrolysis performed in zones in which there is mainly a mixed phase, the following difficulties will arise:

a. The turbulence in the mixer chamber cannot prevent an aliquot of the aqueous anolyte saturated with oxygen from moving from the anode compartment into the cathode compartment and re-oxidiing some of the reduced valuable materials, or prevent aliquots of the catholyte containing the reduced valuable materials from moving into the anode compartment in which the valuable materials will be re-oxidized. Moreover, turbulence would not completely exclude the movement of the organic phase, i.e., the normally light, ascending phase, into the anode compartment, which would reduce the electrode efficiency.

b. Moreover, variations in throughput of the two phases could give rise to phase reversal, i.e., the aqueous phase surrounding the dispersed organic phase and required in the mixed phase as a continuous phase will become a discontinuous phase rather quickly and thus be surrounded by the organic phase. However, this means interruption of the current passage at the respective stage and shutdown of this stage as far as electrolytic reduction is concerned, which reduces the efficiency of the whole system. Hence, the possibilities of automatic control and operation of the separation device are greatly aggravated in the case of reduction in the mixer chamber because of the great variations in the electrical current for the reasons outlined above.

SUMMARY OF THE INVENTION

In the light of these problems, the purpose of the present invention is seen in the creation of a device for the continuous extractive separation of compounds of valuable materials by means of electrolytic reduction, which device should not have the disadvantages of the familiar devices mentioned above and should ensure troublefree execution of the processes with respect to electrolytic reduction, extraction and separation. Moreover, it should offer the possibility of automatic control and operation because of the ever safe funtion and the simple and compact design of the device. Compounds of valuable materials for these purposes shall be metallic compounds, for instance actinide compounds. In addition, the present invention is especially applicable to the separation of plutonium from uranium in organic solutions and to concentrating in the aqueous solution the plutonium obtained in this way. For instance, hexavalent uranium can be reduced to tetravalent uranium. and the tetravalent uranium can be concentrated to a desired level. However, it is possible also to reduce tetravalent plutonium into trivalent plutonium to allow re-extraction from an organic into an aqueous phase and concentration of the trivalent plutonium to a desired level. In addition, the present invention should allow the simple removal of organic phase which has entered the anode compartment.

Moreover, it is very important that the column operate under completely safe conditions, i.e., that sufficient safety against criticality exists also at high throughputs and large cross sections. This safety against criticality must not be impaired by the function of the column.

In accordance with the device of the present invention, these problems are solved in that the orifices of the openings connecting the cathode compartment which the anode compartment face away from the direction of flow of the non-conducting phase. Expressing the orientation of the orifices in different terms, it may be stated that the orifices are oriented in directions which have components parallel to the central, longitudinal column axis and that these directional components all point in the same sense. This definition thus means that in the column the orifices are all similarly oriented: they are all directed either downwardly or upwardly from the horizontal. In a preferred embodiment, the cross-sectional plane of the orifices is situated perpendicular or at an angle relative to the direction of flow of the phase ascending in the column. This design offers particular advantages if the phase descending in the column is an aqueous, i.e., electrically conducting, liquid and the ascending phase is an organic, i.e., electrically non-conducting, liquid.

According to present invention, the orifices connecting the cathode and the anode compartments are bores inclined relative to the axis of the column in the direction of the ascending phase, which bores are arranged in a nozzle element shaped like a conical frustrum in such a way that the outer orifices of the bores are located in the base of the nozzle element facing upward, while the inner orifices are located in the wall adjacent to the anode compartment in the nozzle element. The bores in the nozzle element are arranged preferably on conical surfaces positioned concentrically one inside the other, the diameter of the bores successively increasing with the outer bore being the largest. In this way, a more uniform distribution of flow lines in the liquid is achieved, i.e., preference of the upper, shorter bores is avoided.

In a preferred embodiment of the present invention several nozzle elements are arranged above each other, with the hollow spaces opposite the bores having one anode each positioned thereon, which anodes are electrically connected with each other, and the hollow spaces are interconnected by intermediate tubes.

In a further concept of the present invention, a preferred alternative embodiment provides for the cathode and anode compartments to be separated by at least one tube, an annular space arranged around the tube in the area of the anode which is arranged within the tube, which annular space in turn is separated from the cathode compartment, and openings to the cathode compartment are located on the upper side of this space, whereas the side facing the tube carries the openings to the anode compartment. These openings to the anode compartment are preferably similiar to the bores in the tube which are upwardly inclined. By contrast, the openings to the cathode compartment are arranged on concentric circles around the center axis of the column, with diameters of the openings successively increasing towards the outside, in the same manner as mentioned above. In another concept of the present invention, there is at least one anode compartment surrounded along its entire length by the cathode compartment which is concentric with the anode compartment. Several perforated plates are arranged above each other in this cathode compartment. In a preferred embodiment, the lower side of one or more of these plates carries fins attached to it in a radial arrangement, which fins are located directly above the orifices of the connecting openings and are designed as the cathode.

Finally, in another concept of the present invention, the anode is made of platinum-coated carrier material, preferably tantalum, and the cathode and the outer shell of the column and the perforated plates are made of titanium.

The prescribed and preferred embodiments of the invention can also be combined in another matter than prescribed, for instance by transfering one or more details and embodiments from the first concept to the second concept or reversely.

Finally, the purpose to be fulfilled by the present invention is met by a device for liquid-liquid extraction or any other process step of chemical reprocessing of spent nuclear fuels, preferably in a countercurrent extraction column, a mixer settler or a fast contacter, in that the device contains neutron absorbing structural materials, such as cadmium, boron, boral, or borated steel. In a preferred design, only the anode may be made of a neutron absorbing material, such as a cadmium alloy coated with tantalum and covered with a layer of platinum, or the neutron absorbing structural material used in the anode compartment may be coated with tantalum. In addition, it is possible also to make the perforated plates of the column out of neutron absorbing tantalum coated structural material. Of course, these characteristics enhancing the safety against criticality may be found also in any of the extraction columns according to the present invention as described initially.

Further details and preferred embodiments of the present invention will be explained in greater detail below on the basis of FIGS. 1 and 2.

DESCRIPTION OF THE PREFERRED EMBODIMENTS

Figure 1:
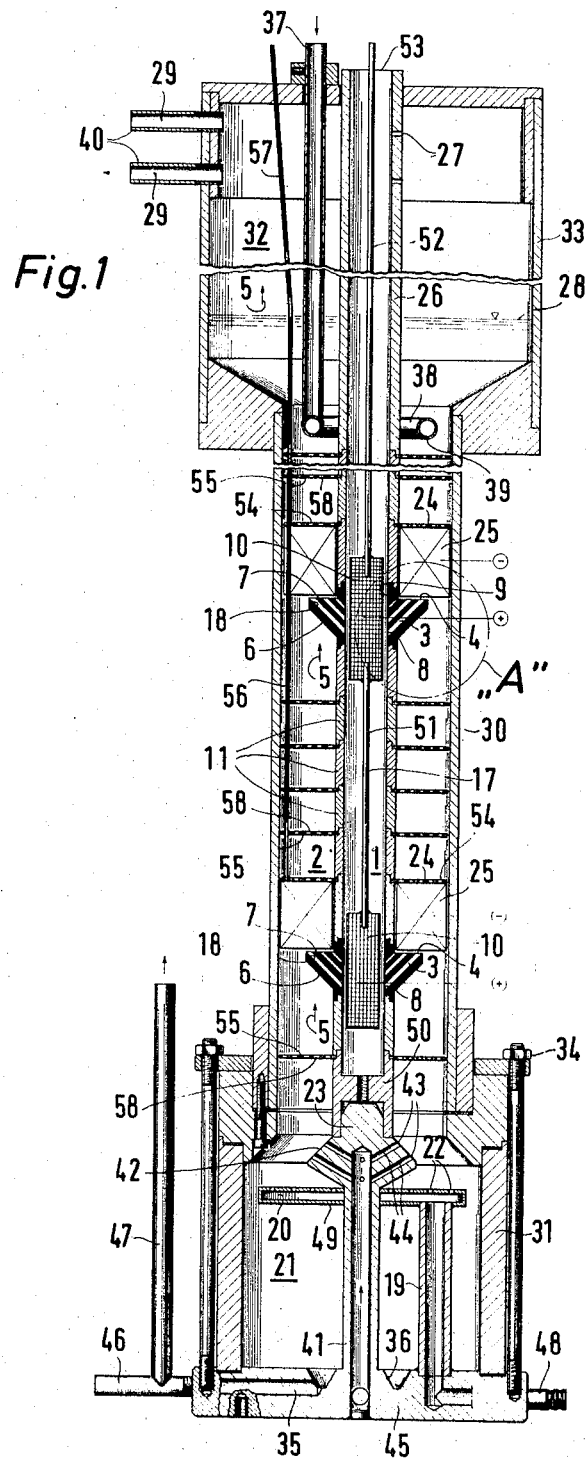
FIG. 1 shows a cross-sectional view of a countercurrent extraction column of a pulsed type according to the present invention.

In accordance with FIG. 1, the extraction column consists of an oblong outer tube 30 which connects the inner compartment of the bottom column compartment 21 of a bottom vessel 31 with the inner compartment of the upper column compartment 32 of the upper vessel 33. In the embodiment shown in the figure, the bottom vessel 31 can be dismantled and opened for experimental purposes by means of the bolted joint 34. The tube 30 contains 2 compartments positioned concentrically one inside the other, namely the inner circular cylindrical anode compartment 1 and the oblong cylindrical cathode compartment 2 arranged around it like a ring. The two compartments 1 and 2 are separated from each other by a wall consisting, among other parts, of the intermediate tubes 11; however the compartments are interconnected by the bores 3 which will be mentioned in greater detail below.

The lower end of the circular cathode compartment 2 is connected with the bottom column compartment 21, the upper end with the upper column compartment 32. The two compartments 21 and 32 are closed to the outside. The upper compartment 32 in vessel 33 contains the feed section for the aqueous phase, i.e., the phase descending in the column. This feed system consists of the tube 37 leading into the vessel 33, which tube discharges into the ring tube 38 situated at the upper end of the cathode compartment 2 and having feed openings 39 facing downward in the direction of this cathode compartment. In addition, the side of the upper vessel 33 contains sockets 40 with outlet openings 29 for the outlet of the organic phase, i.e., the lighter phase ascending in the column. At the level of these openings 29 there are connecting openings 27 between the anode compartment 1 and the upper compartment 32, which connecting openings are situated above the phase interface 28 in the normal operation of the column. These openings 27 can be used to withdraw any organic phase from the anode compartment 1 which has entered it.

The feed device for the organic phase is contained in the upper section of the bottom column compartment 21 of the vessel 31. It consists of a bottom tube 41 leading upward into this vessel and discharging into a lower nozzle element 23 located approximately at the bottom end of cathode compartment 2. This lower nozzle element 23 has a conical shell area 42 on which nozzle apertures 43 are arranged in concentric circles. The nozzle apertures 43 are connected with tube 41 by the connecting bores 44.

Besides the feed device for the organic phase the bottom vessel 31 and the bottom chamber 21, respectively, contain the outlet device of the aqueous phase, i.e., the descending phase. The outlet device consists of the annular channel 36 in the bottom 45 into which the discharge opening 35 discharges. A tube 46 carries another tube 47 leading vertically upward to a level control system (not shown) and to the outlet. Another socket 48 is attached to the bottom 45 for the connection of a pulsing device. The tube socket 48 is connected with another pressure socket 19 in vessel 31 on top of which a plate shaped annular chamber 49 is installed concentric with the center axis of the column 17. The interior 20 of the annular chamber 49 has openings 22 on its upper side which are positioned directly beneath the nozzle apertures 43 of the lower nozzle element 23.

In the embodiment shown in FIG. 1, the anode compartment 1 is separated from the cathode space 2 by several, generally tubular components. From top to bottom this separation is brought about by the upper tube section 26, the nozzle elements 6 shaped like conical frustra, and various intermediate tubes 11. The anode compartment 1 is closed at the bottom, its foot section 50 resting on the nozzle element 23, which feeds the organic phase. In the oblong anode compartment 1 there is one anode at the level of each of the elements 6, the anodes being connected with each other by means of line 51 so as to be electrically conducting. The top anode 10 is connected with the feed line 52 leaving the column, line 51 and feed line 52 at the same time acting as supports of anodes 10. The anode compartment 1 is vented to the top by means of opening 53.

Figure 1A:
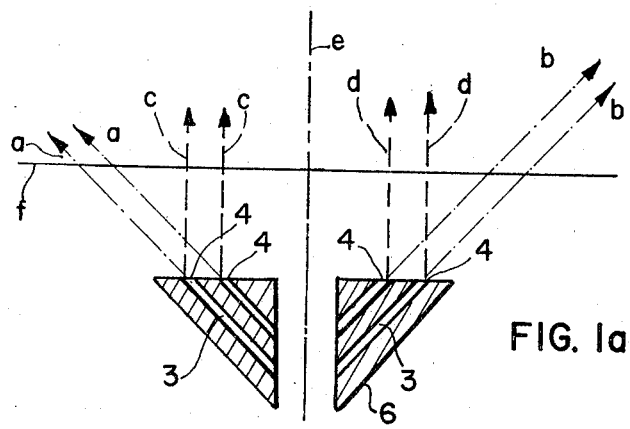
FIG. 1a shows a schematic sectional view of a component of the column illustrated in FIG. 1.

As mentioned above, the anodes 10 are arranged in the anode compartment 1 at the level of the nozzle elements 6. These nozzle elements which include the openings and bores, respectively, which connect the anode compartment 1 with the cathode compartment 2. The inner orifices 8 of these bores 3 are located in the inner wall 9, the outer orifices 4 are located in the base 7 facing upward of the hollow nozzle elements 6. The area of the orifices 8 should correspond to the area of the anodes; the sizes may be adapted by changing the inclination of the bores 3. These bores 3 are upwardly inclined at an angle with respect to the axis of the column 17 so that their outer orifices 4 face away from the direction of flow 5 of the ascending organic phase. In this way, the entrance of organic phase from the cathode compartment 2 through the bores 3 into the anode compartment 1 is prevented or at the very least greatly inhibited because the orifices 4 are located in a dead flow area and in the shadow of the flow, respectively, relative to the direction of flow 5. In addition, the inclination of the bores 3 ensures that droplets of the organic phase which may have entered as a result of the pulsing will rise in the bores 3 after a certain period of time as a result of buoyancy without entering the anode compartment 1. This creates the zone in which the organic phase is reduced or not contained at all. These bores 3 are arranged in groups one above the other and are positioned on conical areas 18 placed concentrically one within the other, with the diameters of the bores successively increasing from the inside to the outside in order to set off their different electrolytic resistances, i.e., to prevent any preference of the inner bores. For defining the orientation of the orifices 4 in terms of their relationship with the column structure, reference is made to FIG. 1a. It is seen that the bores 3 and the orifices 4 are disposed in directions $a$ and $b$ which have, respectively, directional components $c$ and $d$ that are parallel to the central, longitudinal column axis $e$. These directional components $c$ and $d$ all point in the same sense (upwardly in the illustration of FIG. 1a). This definition thus means that in the column the orifices are all similarly oriented: they are all directed either downwardly or upwardly from the horizontal $f$.

The cathodes 25 are arranged directly above the orifices 4; the cathode area exposed in this range should be as large as possible. Thus, the cathodes 25 may be made of fins radially attached to the bottom of perforated plates 24. Fins 25 and plates 24 are connected to each other so as to be electrically conducting. The plates 24 have circular cross sections and are perforated by holes 54 for the phases to pass through. The cathodes 25 and plates 24, respectively, are interconnected by the connections 56 so as to be electrically conducting; the feed line to the outside is represented by line 57. Other perforated plates 55 with bores 58 are provided between the different plates 24 assigned to the individual nozzle elements 6 and the anodes 10, respectively, and supporting the cathodes 25, in order to achieve good mixing of the phases in the pulsed column of liquid. The liquid column is pulsed by the pulsing device described above and by the ring shaped chamber 20 in the bottom part of the column, but pulsing may be achieved also by the perforated intermediate plates 55 and 24, respectively (not shown in detail), if these plates are arranged so as to be movable and equipped with driving mechanisms.

Figure 2:
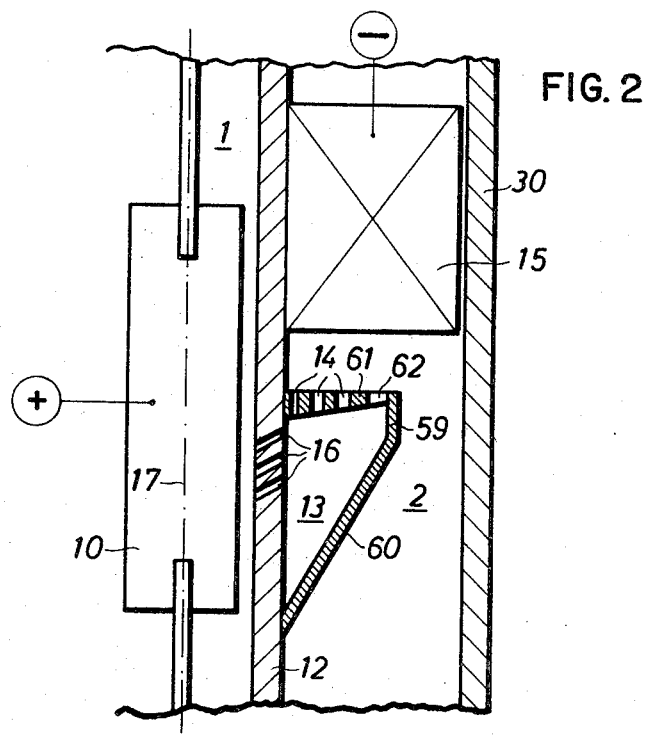
FIG. 2 shows a modified embodiment of section A in FIG. 1.

FIG. 2 is a modified embodiment of section A in FIG. 1. This column consists of an outer tube 30 and an inner tube 12 coaxially arranged within tube 30. The cathode compartment 2 is formed by the annular space between the tubes 12 and 30, the anode compartment 1 is formed by the inner space of tube 12. Cathode 15 and anode 10 are schematically represented and they correspond to the same elements in FIG. 1. In the area of the anode 10, annular space 13 surrounds the tube 12, which annular space 13 is separated from the cathode compartment 2 by a wall 59. The annular space 13 is approximately triangular in shape, having an inclined section 60 which is pointed at the bottom and attached to its wall 59; thus, its outer shape roughly corresponds to the shape of the nozzle element 6 according to FIG. 1. The upper wall 61 arranged perpendicular to the axis of the column 17 increases in thickness toward the center of the column. Bores 14 penetrate this wall 61 on concentric circles around the axis 17, with their diameters successively increasing from the inside to the outside. The outermost bore 62 is located at the very outer edge in the direction of the wall 59. More bores 16 penetrate the tube 12 between the annular space 13 and the anode compartment 1 which, like the bores 3 in FIG. 1, are upwardly inclined. The inclination can be varied to make the discharge area of the bores 16 correspond to the area of the anodes.

This design of the annular space 13 makes for a uniform electrolytic resistance and creates a "stilling room" which allows the separation by gravity of organic phase which may have entered. This phase can then leave in the upward direction through bores 14 without entering the anode compartment 1.

The material best used for columns to be exposed to strong radiation fields is titanium; the tubes should be welded. However, the structural materials may also be such neutron absorbing materials as cadmium, boron carbide, boral or borated steel. These materials will then be covered with a tantalum coating, especially in the anode compartment. The anode is made of a platinum coated carrier material, perferably tantalum. Tantalum is particularly suited for this purpose because, if the platinum coating should be destroyed. the base material would be passivated under the influence of the anode potential. Absorber material may also be used for the anode, but it must be covered with a tantalum coating followed by another coating of platinum. Titanium may be used as the cathode material. In addition, it is advisable to use titanium for all components of the column which may contact negative potentials.

The column is designed so that electrolysis and extractive separation can be performed in it at the same time. The light (organic) phase is fed in at the bottom, the heavy (aqueous) phase is metered in at the top. The design achieves uniform generation of droplets over the whole cross section of the column. The heavy and the light phase leave at the bottom and the top of the column, respectively. A level control system is used to establish the phase interface 28 so as to make the electrically conducting phase the continuous phase, which permits electrolysis to be carried out in the extraction compartment. The central compartment 1 in the column constitutes the anode compartment if electrolytic reduction is carried out, while the outer annular compartment 2 is the cathode compartment in which extraction is going on at the same time. If oxidation is to be performed in the extraction space, the central compartment 1 will be used as the cathode compartment, the outer annular compartment 2 as the anode compartment. In the above case of cathodic reduction in the annular space there is only one common anode compartment for all places of reduction, which compartment continues through the top and will remain open at the top for degasification of the anolyte. As mentioned above, the column will be pulsed, i.e., pulsing is generated in the two phases contained in the column in order to establish the good contact required for a good extraction.

Changes in the level and interface of the phases, respectively, in the column are brought about by U-tube principle by means of a overflow vessel and a level control device. This device can be used also to remove organic phase which entered the anode compartment as a consequence of pulsing or due to inadvertent lowering of the phase interface. In this case, the level will be sufficiently raised to allow the organic phase resting on top of the aqueous phase in compartment 1 to be discharged or forced out through bores 27 into space 32.

EXAMPLE OF AN EMBODIMENT

To reduce uranium (IV) nitrate under countercurrent extraction conditions the following results were achieved with a prototype of the electrolytic extraction column according to the invention:

Solvent 20% TBP
Flow ratio of organic: inorganic 10
Diameter of column 40 mm
Current density at cathode 50 mA/cm$^2$
Current density at anode 20 mA/cm$^2$
Voltage drop 5 volts
Equilibrium concentration, organic 40 g uranium (VI) per liter, Inorganic 30 g uranium (VI) per liter, 3 g uranium (IV) per liter
Current efficiency referred to uranium (IV) per electrolytic plate approximately 20 %.

The advantages of the present invention consist in the following main points:

1. The design of the anode tube with the steps according to the invention ensures that it will mainly contain only aqueous phase, whereas the dispersed organic phase will move upward.
2. The operation of the process is greatly facilitated by the special shape of the electrodes which allows the electrodes to be equipped also with separate current inputs.
3. Small voltage drop in the column due to the absence of a diaphragm.
4. Electrolysis is made possible by the position of the phase interface in the top of the column because this ensures that the aqueous phase is the continuous one.
5. No corrosion of important components of the column.
6. It is possible to arrange several anode compartments in the column.

We claim:

1. A countercurrent extraction column for carrying out a liquid-liquid extraction of two phases which are insoluble in each other, one of which phases is a conducting phase and the other of which is a nonconducting phase with the use of simultaneous electrolysis, the column comprising, in combination:
   a. means forming an upright column having a longitudinal axis;
   b. an upright tube within said column, said tube extending in the direction of said column and dividing a portion of the same into inner and outer compartments through which may flow, in countercurrent, said two phases, one of said compartments being an anode compartment and the other of said compartments being a cathode compartment; said tube including at least one tube section separating said cathode compartment and said anode compartment;
   c. an anode in said anode compartment;

d. a cathode in said cathode compartment; and e. communicating means establishing communication through said tube between said two compartments, said communicating means defining orifices situated in one of the compartments each orifice being oriented in a direction having a component parallel to said axis, the directional components all pointing in the same sense; said communicating means including a nozzle means terminating in said orifices, each orifice having a cross section, the plane of which intersects said axis; said nozzle means including an annular member surrounding said tube section, said annular member defining an annular space between said anode compartment and said cathode compartment, said annular member having outer openings in its upper surface, which outer openings open into said cathode compartment and form said orifices; said outer openings being positioned on concentric circles around the center axis of said column and having outwardly increasing diameters; and inner openings in its inner surface, which inner openings open into said anode compartment and include bores inclined upward in said tube.

2. Column as claimed in claim 1 further comprising a device for the excitation of liquid pulses.

3. Column as defined in claim 2, wherein said device includes: a socket to which a pressure pump is connected and which leads to an annular chamber arranged in the bottom column space concentric to the axis of said column, said annular chamber having outlet openings for the pulsing liquid on its upper side.

4. Column as defined in claim 3, wherein there are a plurality of nozzle means arranged along said tube and said annular chamber is situated immediately below the lowest said nozzle means for the inlet of the phase ascending in said column.

5. A countercurrent extraction column for carrying out a liquid-liquid extraction of two phases which are insoluble in each other, one of which phases is a conducting phase and the other of which is a nonconducting phase with the use of simultaneous electrolysis, the column comprising, in combination:

a. means forming an upright column having a longitudinal axis;

b. an upright tube within said column, said tube extending in the direction of said column and dividing a portion of the same into inner and outer compartments through which may flow, in countercurrent, said two phases; the inner compartment being an anode compartment and the outer compartment being a cathode compartment; said anode compartment being cylindrically and symmetrically surrounded along its longitudinal axis by said cathode compartment;

c. an anode in said anode compartment;

d. a cathode in said cathode compartment;

e. communicating means establishing communication through said tube between said two compartments, said communicating means defining orifices situated in one of the compartments, each orifice being oriented in a direction having a component parallel to said axis, the directional components all pointing in the same sense; said communicating means including a nozzle means terminating in said orifices, each orifice having a cross section, the plane of which intersecting said axis of said column; and f. a plurality of perforated plates arranged in said cathode compartment one above the other.

6. A column as defined in claim 5 wherein said nozzle means is in the form of a conical frustrum disposed around said tube, said nozzle means has a plurality of bores inclined relative to said axis, each of said bores has an outer opening which opens into said outer compartment and faces in an upward direction, said outer openings form said orifices, and each of said bores has an inner opening which opens into said inner compartment with its cross section being substantially parallel to the axis of said tube.

7. A column as defined in claim 6 wherein said bores of said nozzle means are situated on conical surfaces arranged within each other concentrically around the axis of said column, the diameters of said bores increasing towards the outside.

8. A column as defined in claim 7 wherein: there are a plurality of nozzle means arranged along the axis of said tube one above the other, each of said nozzle means defining a hollow space; there are a plurality of said anodes, each of said anodes being disposed with a respective one of said hollow spaces defined by said nozzle means so that said anode is disposed opposite said bores; said anodes are electrically connected with each other so as to be electrically conducting; and said tube includes a tube section in the area of each of said hollow spaces and a plurality of intermediate tubes connected between said tube sections.

9. Column as defined in claim 5, wherein at least one of said plates has fins arranged in a radial pattern on its bottom side, said fins being located directly above said orifices and forming the cathode.

10. Column as defined in claim 9, wherein said anode compartment is open at the top.

11. Column as defined in claim 10, wherein said column has discharge openings in its upper portion and said tube is provided with connecting openings in an upper tube section between said anode compartment and said cathode compartment, which connecting openings are positioned, approximately at the level of said discharge openings for the ascending phase.

12. Column as defined in claim 11, wherein said anode is made of a platinum coated carrier material.

13. A column as defined in claim 12 wherein said carrier material for said anode is tantalum.

14. Column as defined in claim 12, wherein both said cathode and the other components of the column, which are to contact a negative potential, are made of titanium.

15. Column as defined in of claim 14, wherein said tube is made of a tantalum coated structural material.

16. Column as defined in claim 14, wherein the structural material of said column is made of neutron absorbing material with tantalum coating.

17. Column as defined in claim 14, wherein said tube is made of an insulating material.

18. Column as defined in claim 17, wherein the structural material for said anode compartment is neutron abosrbing and is covered with a tantalum coating.

19. A column as defined in claim 17 wherein said insulating material is passivated tantalum.

20. Column as defined in claim 17, wherein said anode is made of a neutron absorbing material with a tantalum coating and a platinum coating on top of it.

21. A column as defined in claim 20 wherein said neutron absorbing material is cadmium.

* * * * *